United States Patent [19]

Teach et al.

[11] 3,723,474
[45] Mar. 27, 1973

[54] META-THIOCARBAMYL PHENYLENE AMIDES AND UREAS AND THEIR UTILITY AS HERBICIDES

[75] Inventors: Eugene G. Teach, El Cerrito; Duane R. Arneklev, Sunnyvale, both of Calif.

[73] Assignee: Stauffer Chemical Company, New York, N.Y.

[22] Filed: Nov. 2, 1970

[21] Appl. No.: 86,379

[52] U.S. Cl..........260/347.2, 260/455 A, 260/453 R, 71/88, 71/100
[51] Int. Cl..........................C07d 5/16, C07c 153/07
[58] Field of Search.......................260/455 A, 347.2

[56] References Cited

OTHER PUBLICATIONS

Browne et al., Chem. Abstr., Vol. 28 (1934) 26891.

Primary Examiner—Alex Mazel
Assistant Examiner—Bernard Dentz
Attorney—Daniel C. Block, Edwin H. Baker, Albert J. Adamcik and Harry A. Pacini

[57] ABSTRACT

Meta-thiocarbamyl phenylene amides and ureas having the formula

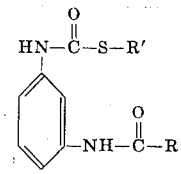

in which R' is alkyl or benzyl and R is alkyl, monoalkylamino, N,N-di-substituted amino wherein said substituents are independently selected from the group consisting of alkyl, alkoxy, furfuryl and cycloalkenyl. The compounds of this invention are useful as herbicides.

30 Claims, No Drawings

META-THIOCARBAMYL PHENYLENE AMIDES AND UREAS AND THEIR UTILITY AS HERBICIDES

This invention relates to certain novel substituted meta-thiocarbamyl phenylene amides and ureas which are useful as herbicides. The compounds of the present invention are new compositions of matter and correspond to the general formula

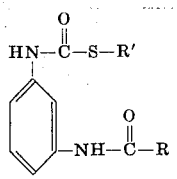

in which R' is alkyl or benzyl and R is alkyl, monoalkylamino, N,N-di-substituted amino wherein said substituents are independently selected from the group consisting of alkyl, alkoxy, furfuryl and cycloalkenyl.

In the above description, the following preferred embodiments are intended for the various substituent groups: for R, alkyl preferably includes, unless otherwise provided for, those members which contain from one to 10 carbon atoms, inclusive, in both straight chain and branched chain configurations, for example, methyl, ethyl, n-propyl, isopropyl, n-butyl, sec.-butyl, 1,1-dimethylbutyl, amyl, isoamyl, 2,4,4-trimethylpentyl, n-hexyl, isohexyl, n-heptyl, n-octyl, isooctyl, nonyl, and decyl; for R' and when used as a substituent on amino in R, alkyl preferably includes those members which contain from one to six carbon atoms in straight and branched chain configurations, for example, methyl, ethyl, n-propyl, isopropyl, n-butyl, sec.-butyl, amyl, isoamyl, n-hexyl and isohexyl; the term cycloalkenyl, preferably includes those members containing at least one olefinic double bond and containing from three to seven carbon atoms, inclusive, for example, cyclopropenyl, cyclobutenyl, cyclopentenyl, cyclohexenyl, cycloheptenyl, and the like; the term alkoxy, preferably includes those members of the group which contain from one to six carbon atoms, such as methoxy, ethoxy, propoxy, and hexoxy and their isomers in branch chained configurations.

The compounds of this invention have been found to be active herbicides of a general type. That is, certain members of the class have been found to be herbicidally effective against a wide range of plant species. A method of controlling undesirable vegetation of the present invention comprises applying an herbicidally effective amount of the above-described compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinant seeds, emerging seedlings, and established vegetation, including the roots and above-ground portions.

The compounds of the present invention are prepared by several different methods, depending upon the nature of the starting materials and the products desired. For example, the meta-thiocarbamyl phenylene ureas are prepared by reacting a suitable aminophenyl urea with a suitable substituted chlorothiolformate in the presence of a tertiary amine, such as triethylamine. The reactions proceed readily in the liquid phase. The employment of a solvent is also useful, facilitating processing, as well as agitation of the reactants. Solvents such as acetone are conveniently employed. The reactions are carried out at temperatures that permit operation in the liquid phase. The temperatures are between about room temperature and reflux temperature of the solvent, if a solvent is employed. When preparing meta-thiocarbamyl phenylene amides, a suitable meta-amino anilide is reacted with a substituted chlorothiolformate in the presence of a tertiary amine, such as, triethylamine. In each instance after the reaction is complete, the recovery of the product is carried out by normal work-up procedures such as crystallization, sublimation or distillation.

The compounds of the present invention and their preparation are more particularly illustrated by the following examples. Following the examples is a table of compounds which are prepared according to the procedures described herein.

EXAMPLE I

Preparation of 3'-Pivalamido phenyl-S-isopropyl thiolcarbamate

Twelve and seven-tenths grams of 3'-amino pivalanilide is dissolved in 100 ml. of acetone and 7.1 g. of triethylamine is added. Isopropyl chlorothiolformate, 9.7 g. is added dropwise with stirring. When reaction is complete, the mixture is poured into 500 ml. of cold water and the crystalline product is filtered off, washed with dilute NaOH, dilute HCl and water and dried under vacuum. There is obtained 17.5 g., m.p. 146°–147°C., of the title compound.

EXAMPLE II

Preparation of 3'-propionamidophenyl-S-t-butylthiolcarbamate

Eleven and one-half grams of 3'-amino propionanilide is dissolved in 100 ml. of acetone and 7.1 g. of triethylamine added. Ten and eight-tenths grams of t-butyl chlorothiolformate is added dropwise with stirring. At the conclusion of the reaction, the mixture is poured into approximately 500 ml. of cold water and the product, which crystallized out, is filtered off and washed with dilute NaOH, dilute HCl and water and dried under vacuum. There is obtained 17.2 g., m.p. 171°–173°C., of the title compound.

EXAMPLE III

Preparation of 1(3'-t-Butylthiocarbamylphenyl) 3-ethyl urea

Twelve and one-half grams of 1(3'-amino phenyl) 3-ethyl urea is dissolved in 100 ml. of acetone and 7.1 g. of triethylamine added. Ten and seven-tenths grams of t-butyl chlorothiolformate is added dropwise and when reaction is complete, the mixture is poured into approximately 500 ml. of cold water. The solid product is washed in a blender with dilute NaOH, filtered and washed with dilute HCl and water and dried under vacuum. Yield is 17.7 g., m.p. 158°–169°C. The product is taken up in isopropyl alcohol and the insoluble fraction (2.3 g., m.p. 341°–343°C.) is filtered off. The IPA solution is treated with water and the product recovered by filtration. There is obtained 12.8 g., m.p. 153°–155°C., with decomposition, of the title compound.

EXAMPLE IV

Preparation of 1(3'-Isopropylthiocarbamylphenyl) 3-methyl urea

Eleven and one-half grams of 1(3'-amino phenyl)3-methyl urea is dissolved in 100 ml. of acetone and 7.1 g. of triethylamine added. Isopropyl chlorothiolformate, 9.7 g., is added dropwise with stirring and when reaction is complete, the mixture is poured into approximately 500 ml. of cold water. The product is recovered by filtration and washed with dilute NaOH, dilute HCl, water and dried in the vacuum oven. There is obtained 16 g., m.p. 175°–178°C., of the title compound.

EXAMPLE V

Preparation of 1(3'-Butylthiocarbamylphenyl)3,3-dimethyl urea

Ten and eight-tenths grams of 1(3'-amino phenyl) 3,3-dimethyl urea is dissolved in 100 ml. of acetone and 7.1 g. of triethylamine is added. Nine and two-tenths grams of t-butylchlorothiolformate is added dropwise with stirring. When reaction is complete, the mixture is poured into water and a viscous oil precipitated. The product is taken up in methylene dichloride and washed with dilute HCl and dried over magnesium sulfate. The methylene chloride is taken off under vacuum, leaving a solid foam. There is obtained 15.9 g., m.p. 68°–71°C., of the title compound.

The following is a table of the compounds which are prepared according to the aforementioned procedures. Compound numbers have been assigned to them and are used for identification throughout the balance of the specification.

TABLE I

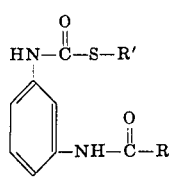

| Compound Number | R | R' | M.P. °C. or $n_D^{30}$ |
|---|---|---|---|
| 1 | $C_2H_5$- | $C_2H_5$- | 162–164 |
| 2 | $C_2H_5$- | i-$C_3H_7$- | 181–182.5 |
| 3 | t-$C_4H_9$- | i-$C_3H_7$- | 146–147 |
| 4 | $C_3H_7C(CH_3)_2$- | i-$C_3H_7$- | 1.5425 |
| 5 | $C_2H_5$- | t-$C_4H_9$- | 171–173 |
| 6 | t-$C_4H_9$- | t-$C_4H_9$- | 161–165 |
| 7 | $C_3H_7C(CH_3)_2$- | t-$C_4H_9$- | 1.5410 |
| 8 | $C_2H_5$- | $C_6H_5CH_2$- | 140–143 |
| 9 | t-$C_4H_9$- | $C_6H_5CH_2$- | 117–122 |
| 10 | $C_3H_7C(CH_3)_2$- | $C_6H_5CH_2$- | 103–107 |
| 11 | $C_2H_5NH$- | i-$C_3H_7$ | 144–148 |
| 12 | $C_2H_5NH$- | t-$C_4H_9$- | 153–155 |
| 13 | $C_2H_5NH$- | $C_6H_5CH_2$- | 174–177 |
| 14 | $CH_3NH$- | i-$C_3H_7$- | 175–178 |
| 15 | $CH_3NH$- | t-$C_4H_9$- | 176–178 |
| 16 | $CH_3NH$- | $C_6H_5CH_2$- | 161–166 |
| 17 | $(CH_3)_2N$- | t-$C_4H_9$ | 68–71 |
| 18 | $C_3H_7CH(CH_3)$- | i-$C_3H_7$- | 130.5–133.5 |
| 19 | $C_3H_7CH(CH_3)$- | t-$C_4H_9$- | 47–51 |
| 20 | (n-$C_4H_9$)$CH_3N$- | $CH_3$- | Glass |
| 21 | (n-$C_4H_9$)$CH_3N$- | t-$C_4H_9$- | Glass |
| 22 | ($CH_3O$)$CH_3N$- | $CH_3$- | Glass |
| 23 | ($CH_3$)⟨furan⟩$CH_2$—N— | $CH_3$- | 1.6098 |
| 24 | ($CH_3$)⟨furan⟩$CH_2$—N— | i-$C_3H_7$- | Glass |
| 25 | ($CH_3$)⟨furan⟩$CH_2$—N— | t-$C_4H_9$- | Glass |
| 26 | ($CH_2$)⟨thiophene⟩—N— | i-$C_3H_7$- | 1.5520 |
| 27 | ($CH_2$)⟨thiophene⟩—N— | t-$C_4H_9$- | 1.5427 |
| 28 | (sec.-$C_4H_9$)$CH_3N$- | i-$C_3H_7$ | 178–179 |
| 29 | (sec.-$C_4H_9$)$CH_3N$- | t-$C_4H_9$ | 150–153 |
| 30 | ($CH_3$)$_3CCH_2CH(CH_3)CH_2$- | $CH_3$- | 1.5513 |
| 31 | ($CH_3$)$_3CCH_2CH(CH_3)CH_2$- | i-$C_3H_7$- | 1.5393 |
| 32 | ($CH_3$)$_3CCH_2CH(CH_3)CH_2$- | t-$C_4H_9$- | Glass |
| 33 | ($CH_3O$)$CH_3N$- | i-$C_3H_7$- | 167–170 |
| 34 | ($CH_3O$)$CH_3N$- | t-$C_4H_9$- | 1.5785 |

HERBICIDAL SCREENING TESTS

As previously mentioned, the herein described compounds produced in the above-described manner are phytotoxic compounds which are useful and valuable in controlling various plant species. Compounds of this invention are tested as herbicides in the following manner.

Pre-emergence herbicide test. On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1 percent Tween 20 (polyoxyethylene sorbitan monolaurate). The following day each flat is sprayed at the rate of 20 pounds of the candidate compound per 80 gallons of solution per acre. An atomizer is used to spray the solution onto the soil surface. The flats are placed in a greenhouse at 80° F. and watered regularly. Two weeks later the degree of weed control is determined by comparing the amount of germination and growth of each weed in the treated flats with weeds in several untreated control flats. The rating system is as follows:

0 = no significant injury (approximately 0–10 percent control)

3 = slight injury (approximately 10–40 per cent control)

6 = moderate injury (approximately 40–70 per cent control)

9 = severe injury or death (approximately 70–100 per cent control)

An activity index is used to represent the total activity on all seven weed species. The activity index is the sum of the numbers divided by 3, so that an activity index of 21 represents complete control of all seven weeds. The results of this test are reported in Table II.

Post-emergence herbicide test. Seeds of five weed species, including hairy crabgrass, watergrass, California red oats, Indian mustard, and curly dock and one crop, pinto beans (*Phaseolus vulgaris*), are planted in flats as described above for pre-emergence screening. The flats are placed in the greenhouse at 72°–85°F. and watered daily with a sprinkler. About 10 to 14 days after planting, when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1 percent Tween 20 (polyoxyethylene sorbitan monolaurate) and then adding 5 ml. of water. The solution is sprayed on the foliage using an atomizer. The spray concentration is 0.5 percent and the rate would be approximately 20 lb/acre if all of the spray were retained on the plant and the soil, but some spray is lost so it is estimated that the application rate is approximately 12.5 lb/acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the preemergence test where (0), (3), (6), and (9) are used for the different rates of injury and control. The injury symptoms are also recorded. The maximum activity index for complete control of all the species in the post-emergence screening test is 18. This index represents the sum of the rating numbers obtained with the six plant species used in the test divided by 3. The herbicide activity index is shown in Table II.

TABLE II

HERBICIDAL ACTIVITY SCREENING RESULTS

| | Herbicidal activity index** | |
|---|---|---|
| Compound number | Pre-emergence (20 lb/A) | Post-emergence (12.5 lb/A) |
| 1 | 9 | 12 |
| 2 | 10 | 14 |
| 3 | 12 | 18 |
| 4 | 12 | 17 |
| 5 | 10 | 16 |
| 6 | 10 | 13 |
| 7 | 12 | 13 |
| 8 | 6 | 12 |
| 9 | 6 | 12 |
| 10 | 4 | 12 |
| 11 | 11 | 18 |
| 12 | 10 | 18 |
| 13 | 1 | 12 |
| 14 | 21 | 18 |
| 15 | 21 | 18 |
| 16 | 11 | 16 |
| 17 | 21 | 18 |
| 18 | 10 | 14 |
| 19 | 11 | 13 |
| 20 | 20 | 18 |
| 21 | 14 | 15 |
| 22 | 20 | 18 |
| 23 | 13 | 16 |
| 24 | 12 | 18 |
| 25 | 11 | 16 |
| 26 | 12 | 18 |
| 27 | 11 | 17 |
| 28 | 17 | 18 |
| 29 | 17 | 15 |
| 30 | 14 | 16 |
| 31 | 5 | 5 |
| 32 | 2 | 5 |
| 33 | 18 | 18 |
| 34 | 19 | 17 |

** 21 = 70–100% control of all seven plant species tested pre-emergence.
18 = 70–100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like, in the form and manner required. The mixtures can be dispersed in water with the aid of a wetting agent or they can be employed in organic liquid compositions, oil and water, water in oil emulsions, with or without the addition of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compound described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least one-half inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include, for example, 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino)-6-methyl-thio-S-Triazine; 2-chloro-4-ethylamino-6-isopropylamino-S-triazine, and 2-ethylamino-4-isopropylamino-6-methylmercapto-S-triazine, urea derivatives, such as 3-(3,4-dichlorophenyl)-1,1-dimethyl urea and 3-(p-chloro-phenyl)-1,1-dimethyl urea and acetamides such as N,N-diallyl-α-chloroacetamide, N-(α-chloroacetyl)hexamethylene imine, and N,N-diethyl-α-bromacetamide, and the like; benzoic acids such as 3-amino-2,5-dichlorobenzoic; and thiocarbamates, such as S-propyl dipropylthiocarbamate; S-ethyl-dipropylthiocarbamate, S-ethylcyclohexyl-ethyl-thiocarbamate; S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula

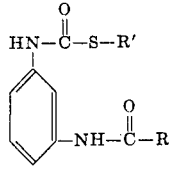

in which R' is alkyl containing from one to six carbon atoms, inclusive, or benzyl and R is alkyl containing from one to 10 carbon atoms, inclusive, mono-alkylamino, N,N-di-substituted amino wherein said substituents are independently selected from the group consisting of alkyl containing from one to six carbon atoms, inclusive, alkoxy containing from one to six carbon atoms, inclusive, furfuryl and cycloalkenyl containing from three to seven carbon atoms, inclusive.

2. A compound according to claim 1 in which R' is alkyl and R is alkyl.

3. A compound according to claim 2 in which R' is ethyl, and R is ethyl.

4. A compound according to claim 2 in which R' is isopropyl and R is ethyl.

5. A compound according to claim 2 in which R' is isopropyl and R is tert.-butyl.

6. A compound according to claim 2 in which R' is isopropyl and R is 1,1-dimethylbutyl.

7. A compound according to claim 2 in which R' is tert.-butyl and R is ethyl.

8. A compound according to claim 2 in which R' is tert.-butyl and R is tert.-butyl.

9. A compound according to claim 2 in which R' is tert.-butyl and R is 1,1-dimethylbutyl.

10. A compound according to claim 1 in which R' is benzyl and R is alkyl.

11. A compound according to claim 10 in which R is ethyl.

12. A compound according to claim 10 in which R is tert.-butyl.

13. A compound according to claim 10 in which R is 1,1-dimethylbutyl.

14. A compound according to claim 1 in which R' is alkyl and R is mono-alkylamino.

15. A compound according to claim 14 in which R' is isopropyl and R is ethylamino.

16. A compound according to claim 14 in which R' is tert.-butyl and R is ethylamino.

17. A compound according to claim 14 in which R' is isopropyl and R is methylamino.

18. A compound according to claim 14 in which R' is tert.-butyl and R is methylamino.

19. A compound according to claim 1 in which R' is benzyl and R is mono-alkylamino.

20. A compound according to claim 19 in which R is ethylamino.

21. A compound according to claim 19 in which R is methylamino.

22. A compound according to claim 1 in which R' is alkyl and R is dialkylamino.

23. A compound according to claim 22 in which R' is methyl and R is N-methyl-N-n-butylamino.

24. A compound according to claim 22 in which R' is tert.-butyl and R is N-methyl-N-n-butylamino.

25. A compound according to claim 1 in which R' is alkyl and R is N-alkyl-N-alkoxyamino.

26. A compound according to claim 25 in which R' is methyl and R is N-methyl-N-methoxyamino.

27. A compound according to claim 25 in which R' is isopropyl and R is N-methyl-N-methoxyamino.

28. A compound according to claim 25 in which R' is tert.-butyl and R is N-methyl-N-methoxyamino.

29. A compound according to claim 1 in which R' is alkyl and R is N-alkyl-N-furfurylamino.

30. A compound according to claim 1 in which R' is alkyl and R is N-alkyl-N-cycloalkenylamino.

* * * * *